3,350,307
LUBRICATING GREASES

Alexander Brown, Goff's Oak, and Harold John Wellard, Sawbridgeworth, England, assignors to Murex Welding Processes Limited, Waltham Cross, Hertfordshire, England, a British company
Filed May 3, 1965, Ser. No. 452,884
Claims priority, application Great Britain, May 15, 1964, 20,400/64
8 Claims. (Cl. 252—30)

ABSTRACT OF THE DISCLOSURE

A lubricating grease comprising a thickened aqueous solution of sodium or potassium silicate or their mixtures. The thickening agent employed can be an organic or inorganic material and can include bentonite, china clay, talc, the silicates of calcium, magnesium and aluminum, the carbonates of sodium or potassium, gum karaya, gum arabic or sodium alginate.

---

This invention provides a lubricating grease having a high resistance to breakdown under load and devoid of conventional hydrocarbon oils.

The grease according to the invention comprises an aqueous solution of sodium and/or potassium silicate which contains a thickening agent. The thickening agent is included for the purpose of rendering the solution sufficiently viscous to constitute a grease and is preferably present in sufficient amount to produce a thixotropic grease. The thickening agent may be inorganic. e.g. bentonite, china clay, talc, chemically precipitated calcum, magnesium or aluminum silicate or sodium or potassium carbonate; or organic, e.g. gum karaya, gum arabic or sodium alginate.

The silicate solution should have, prior to addition of the thickening agent, a specific gravity in the range of 1.2–1.7. The lubricating effect of the grease depends upon the formation of a film of silicate upon the surface to be lubricated, and the function of the thickener is merely to render the solution sufficiently viscous to ensure that it will remain in place in a bearing to be lubricated. Accordingly a plurality of the above described thickeners can be used in combination.

We prefer to use sodium silicate rather than potassium silicate because it is cheaper. Of the thickeners, potassium carbonate is preferred because it dissolves readily and rapidly in the silicate solution. Potassium carbonate may conveniently be added as a concentrated aqueous solution to the silicate solution. The next preferred thickener is chemically precipitated calcium silicate. When chemically precipitated calcium, magnesium or aluminum silicate is used as the thickener, it is desirable to warm the sodium or potassium silicate solution to facilitate formation of a gel. The above mentioned organic gum thickeners are sometimes subjected to oxidative attack and it is accordingly better to use an inorganic thickener when the grease is required to have a long life.

The following tables indicate appropriate amounts of the above thickeners for use with various silicate solutions:

TABLE I.—SODIUM SILICATE SOLUTIONS AND THICKENING AGENTS

| Ranges | Ratio $SiO_2/Na_2O$ By weight | Specific gravity | Sodium or potassium carbonate, weight percent of solution | Calcium, magnesium or aluminium silicate, weight percent of solution | Organic gums as described above, weight percent of solution | Bentonite, clay or talc, weight percent of solution |
|---|---|---|---|---|---|---|
| 1 | 1.0–2.0 | ¹1.6 | 6–25 | 7–32 | 4–16 | 7–125 |
|   | 1.6–1.8 | 1.65–1.7 | 12–19 | 14–23 | 8–13 | 25– 90 |
| 2 | 2.0–2.5 | ¹1.55 | 3–20 | 4–25 | 2–13 | 15–110 |
|   | 2.0–2.2 | 1.6–1.7 | 6–10 | 7–12 | 4– 7 | 20– 50 |
| 3 | 2.5–3.3 | ¹1.4 | 2–18 | 2–23 | 1–12 | 4– 80 |
|   | 2.6–2.8 | 1.4–1.5 | 3– 7 | 4–10 | 1.5– 4 | 6– 35 |
| 4 | 3.3–4.0 | ¹1.25 | 0.75–12 | 1–15 | 0.5– 8 | 2– 60 |
|   | 3.4–3.6 | 1.3–1.35 | 1–2.5 | 1– 3 | 0.75– 2 | 4– 12 |

¹ Minimum.

TABLE II.—POTASSIUM SILICATE SOLUTIONS AND THICKENING AGENTS

| Ranges | Ratio $SiO_2/K_2O$ By weight | Specific gravity | Sodium or potassium carbonate, weight percent of solution | Calcium, magnesium or aluminium silicate, weight percent of solution | Organic gums as described above, weight percent of solution | Bentonite, clay or talc, weight percent of solution |
|---|---|---|---|---|---|---|
| 1 | 1.0–2.0 | ¹1.4 | 3.5–22 | 4–27 | 3–15 | 10–110 |
|   | 1.4–1.6 | 1.5–1.6 | 11–18 | 15–21 | 7–11 | 25– 80 |
| 2 | 2.0–2.2 | ¹1.3 | 3–19 | 4–24 | 2–13 | 15–100 |
|   | 2.0–2.2 | 1.35–1.4 | 8–12 | 10–15 | 6– 9 | 40– 60 |
| 3 | 2.2–2.6 | ¹1.2 | 2.5–16 | 3–19 | 0.2–10 | 12– 80 |
|   | 2.2–2.4 | 1.25–1.3 | 5.5–10 | 7–12 | 4– 8 | 35– 50 |

¹ Minimum.

We find that the grease has better lubricating properties when the silicate solutions are at the less acid end of the ranges given in the tables. Thus the best range for sodium silicate solutions is that in which the $SiO_2/Na_2O$ ratio by weight is 1.0–2.5, and the best range for potassium silicate solutions is that in which the $SiO_2/K_2O$ ratio by weight is 1.0–2.2. It is preferred in any range of composition of the silicate solution to use the most concentrated solution within the range as less thickening agent is then required.

Specific aqueous silicate solutions referred to in the examples below have the following compositions in proportions by weight:

| | Na₂O, percent | SiO₂, percent | K₂O, percent | H₂O, | Specific gravity |
|---|---|---|---|---|---|
| C 100 | 14 | 28.1 | | 57.9 | 1.5 |
| A 140 | 18 | 36 | | 46 | 1.7 |
| P 84 | 9.4 | 29.9 | | 60.7 | 1.42 |
| K 76 | | 26.5 | 12.4 | 61.1 | 1.38 |

The grease may also contain, for the purpose of reducing friction between the lubricated surfaces, 0.25–25% by weight of molybdenum disulphide, 0.25–30% by weight of graphite, or 0.25–30% of a mixture of these additives.

The following are examples of greases in accordance with the invention, proportions being by weight:

| | Percent | | | | | | | |
|---|---|---|---|---|---|---|---|---|
| | 1 | 2 | 3 | 4 | 5 | 6 | 7 | 8 |
| Graphite | 5 | 3 | | 2 | | 1 | 1 | 2 |
| MoS₂ | 5 | 5 | 15 | | 3 | 3 | 4 | 3 |
| Bentonite | 7 | 15 | | | | | | |
| Gum karaya | | | | 3 | | | | |
| Talc | | | | 2 | | ½ | | |
| Calcium Silicate | | | | | | 6 | | |
| Sodium Alginate | | | | 1 | | ½ | | |
| Sodium Carbonate | | | | | | | | 4 |
| A 140 | Balance | Balance | | | | | | |
| C 100 | | | Balance | | | | | |
| P 84 | | | | Balance | | Balance | 40 | Balance |
| K 76 | | | | | Balance | | Balance | |

The grease according to the invention can be injected by a grease gun to a site where lubrication is required in similar manner to a conventional grease based on hydrocarbon oils. It can also be used for the impregnation of porous bearings which operate in organic solvents which dissolve conventional greases.

What we claim as our invention and desire to secure by Letters Patent is:

1. A lubricating grease, consisting essentially of an aqueous solution of a member selected from the group consisting of sodium silicate and potassium silicate thickened with a water-thickening agent.

2. A lubricating grease, as claimed in claim 1 wherein the aqueous silicate solution has a specific gravity of 1.2–1.7.

3. A grease as claimed in claim 1, wherein the solution is a solution of sodium silicate in which the ratio by weight of SiO₂/Na₂O is 1.0–2.5.

4. A grease as claimed in claim 1, wherein the solution is a solution of potassium silicate in which the ratio by weight of SiO₂/K₂O is 1.0–2.2.

5. A grease as claimed in claim 1, in which the thickener is calcium silicate.

6. A grease as claimed in claim 1, which contains, as an anti-friction additive, 0.25–25% by weight of molybdenum disulphide.

7. A grease as claimed in claim 1, which contains as an anti-friction additive 0.25–30% by weight of graphite.

8. A grease as claimed in claim 1, which contains, as an anti-friction additive, 0.25–30% by weight of a mixture of graphite and molybdenum disulphide.

References Cited

UNITED STATES PATENTS

| | | | |
|---|---|---|---|
| 2,629,691 | 2/1953 | Peterson | 252—28 |
| 2,656,315 | 10/1953 | Eckert | 252—29 |
| 2,681,313 | 6/1954 | Kather et al. | 252—28 |

DANIEL E. WYMAN, *Primary Examiner.*

I. VAUGHN, *Assistant Examiner.*